United States Patent [19]

Hagin et al.

[11] Patent Number: 5,052,987
[45] Date of Patent: Oct. 1, 1991

[54] STEPLESS HYDROSTATIC-MECHANICAL TRANSMISSION

[75] Inventors: Faust Hagin; Hans Drewitz, both of Munich, Fed. Rep. of Germany

[73] Assignee: Man Nutzfahrzeuge AG, Munich, Fed. Rep. of Germany

[21] Appl. No.: 498,827

[22] Filed: Mar. 23, 1990

[30] Foreign Application Priority Data

Apr. 14, 1989 [DE] Fed. Rep. of Germany ....... 3912369
Apr. 14, 1989 [DE] Fed. Rep. of Germany ....... 3912386

[51] Int. Cl.⁵ .................................................. F16H 47/04
[52] U.S. Cl. ....................................... 475/82; 475/74; 475/267; 475/153
[58] Field of Search ...................... 475/5, 6, 12, 13, 72, 475/74, 75, 76, 78, 80, 84, 267, 81, 82, 153; 180/165

[56] References Cited

U.S. PATENT DOCUMENTS

| | | | |
|---|---|---|---|
| 3,468,192 | 9/1969 | Nasvytis | 475/81 X |
| 3,913,325 | 10/1975 | Miyao et al. | 475/72 X |
| 4,216,684 | 8/1980 | Hagin et al. | 475/74 |
| 4,233,858 | 11/1980 | Rowlett | 475/5 |
| 4,313,351 | 2/1982 | Hagin | 475/267 X |
| 4,423,794 | 1/1984 | Beck | 475/5 X |
| 4,471,668 | 9/1984 | Elsner | 475/72 |
| 4,843,907 | 7/1989 | Hagin et al. | 475/80 |

FOREIGN PATENT DOCUMENTS

159445 10/1985 European Pat. Off. .............. 475/72

Primary Examiner—Allan D. Herrmann
Assistant Examiner—Benjamin Levi
Attorney, Agent, or Firm—Ladas & Parry

[57] ABSTRACT

A stepless hydrostatic mechanical transmission between a prime mover and a power output train in which an epicyclic differential is incorporated in the transmission and includes at least four shafts, a large and a small sun wheel, two planet wheels in mesh with the sun wheels, a web supporting the planet wheels and an annulus. Two main shafts constituting input and output shafts are connected with respectively different shafts of the epicyclic differential. Two hydrostatic machines are connected to the epicyclic differential such that in at least one working range of the power transmission the hydrostatic machines are adapted to be connected to the epicyclic differential and operated as pumps and motors. The operation of at least one of the hydrostatic machines is changed over by a clutch, when the other hydrostatic machine is stationary and during transition from one working range to another, from connection with the output shaft to the small sun wheel and, during traction operation, from the motor function to the pump function. In the epicyclic differential, the large sun wheel is driven by the input shaft and is located between the small sun wheel and the prime mover.

14 Claims, 5 Drawing Sheets

STEPLESS HYDROSTATIC-MECHANICAL TRANSMISSION

BACKGROUND OF THE INVENTION

The invention relates to a stepless hydrostatic mechanical transmission with power distribution splitting to be used between a prime mover and a power output train comprising:

an epicyclic differential made up of at least four shafts, two sun wheels, at least two plant wheels meshing respectively with said sun wheels, a web bearing the said plant wheels and an annulus, two main shafts constituting an input and an output respectively and connected with respectively different ones of the shafts of the epicyclic differential, and at least two hydrostatic machines, which respectively in at least one working range of the said power distribution transmission are adapted to be connected with their own shafts of the epicyclic differential and are adapted to be operated as pumps and motors at least one of said hydrostatic machines being adapted to be changed over by a clutch, when the other respective hydrostatic machine is stationary and on transition from one such working range to another, from the main shaft on the output side to the sun wheel not on the drive side and, during traction operation, from the motor function to the pump function.

The invention takes as a starting point the device as described in the German patent 2,904,572 and its US equivalent U.S. Pat. No. 4,313,351 in the form of a stepless hydrostatic mechanical power transmission adapted to be used as part of a drive system, as for instance part of the drive system of a vehicle, whose epicyclic differential is so designed that the small sun wheel thereof is placed between a large sun wheel and a drive motor. As a result of this the shaft carrying the small sun wheel and not arranged on the drive side, had to be in the form of a hollow shaft and arranged to coaxially surrounding the input shaft bearing the large sun wheel. Since the size of such epicyclic differentials is dependent on there being a small sun wheel, such a design and configuration of the two sun wheels and their shafts also dictated the overall size of the power transmission. Therefore, dependent on the power requirement practical design problems arose as regards the accommodation of the prime mover, for instance in a vehicle, more especially if a power storing flywheel was provided as part of a brake energy recovery system.

SUMMARY OF THE INVENTION

An object of the present invention is to so design the power transmission, while keeping to the general principle of the transmission, that it has smaller overall size while being designed to handle the same power.

A still further object of the invention is to design the transmission that as considered as part of an overall drive system it makes a contribution to the reduction in size thereof.

In order to achieve these or other objects appearing from the present specification, claims and drawings, in the epicyclic differential the power input point effective for driving, as the drive side main shaft is placed in a space between the sun wheel arranged on a shaft, which is not on the drive side, and the prime mover arranged on the input side of the transmission.

Owing to the design of the epicyclic differential in accordance with the invention it is now possible, unlike the case with the previous construction, for the sun wheel (the small sun wheel) mounted on the shaft not on the drive side, to be made smaller in diameter, since the shaft which is not in the drive side no longer has to be a hollow shaft (as has so far been the case) and is in the form of a solid shaft and need only be dimensioned so suit the size of the small sun wheel. The result of this is that all other power transmitting parts of the epicyclic differential have a smaller diameter so that the said epicyclic differential generally has a smaller overall size.

Such a smaller overall size of the power transmission may be more advantageously accommodated in equipment, as for example in a vehicle, lifting gear such as a crane, etc. and leaves space for the installation of other items.

A point which is particularly important is that the power splitting transmission in accordance with the invention is well suited for connection with a flywheel as an energy storing means in a very compact design. In a motor vehicle it is thus possible to achieve a degree of compactness of the drive arrangement which so far has not been considered to be possible.

The smaller size of the sun wheel which is not on the drive side also involves the special advantage of an increase in the speed of the flywheel so that in comparison with the previous design there is a higher degree of energy storage in the flywheel or the same amount of energy may be stored in a flywheel with a smaller diameter than previously, without increasing the peripheral speed of the gearwheels in the epicyclic differential.

The invention will now be described in more detail with reference to the drawings.

BRIEF DESCRIPTION OF THE SEVERAL FIGURES OF THE DRAWINGS.

FIG. 1 and

FIG. 2 each diagrammatically show one working embodiment of the stepless hydrostatic power transmission in accordance with the invention.

Figure 3:
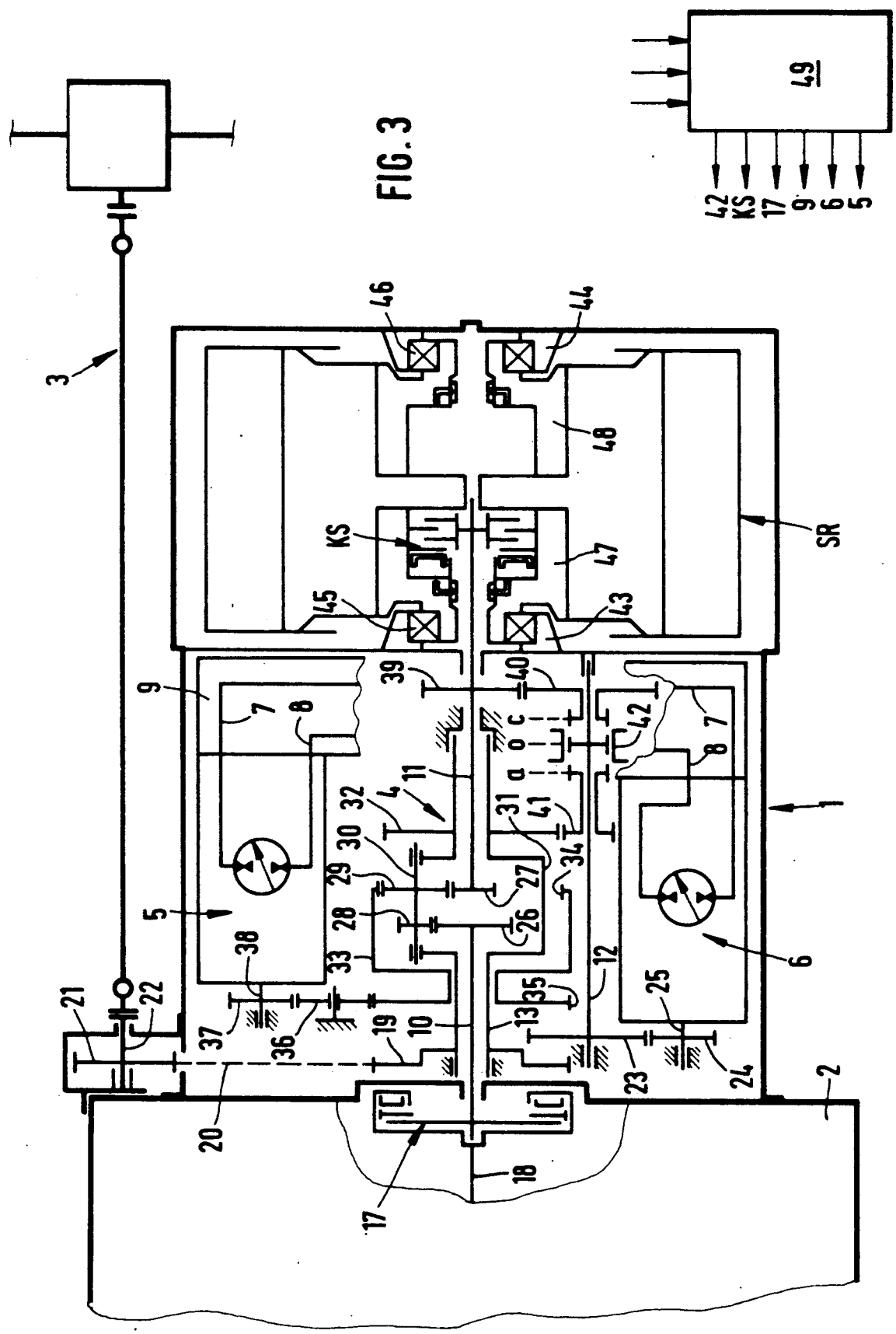
FIG. 3 shows the power splitting transmission in accordance with the invention as in FIG. 2 in conjunction with other parts of a drive arrangement of a vehicle.
Figure 5:
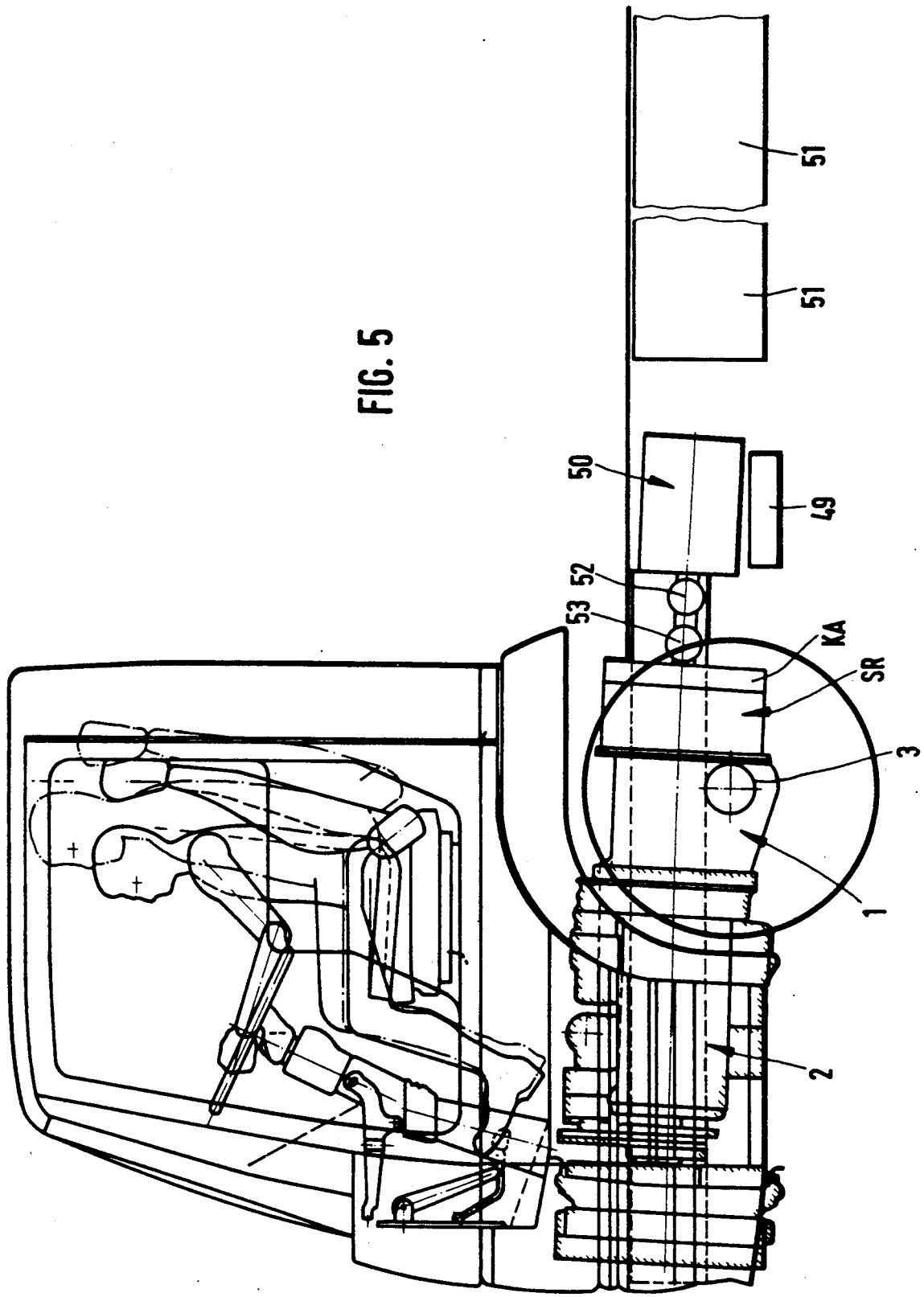

FIG. 5 diagrammatically shows the installation of the drive arrangement of FIG. 3 in a vehicle.

DETAILED DESCRIPTION OF WORKING EMBODIMENTS OF THE INVENTION.

In what follows the stepless hydrostatic power transmission will be referred to as an SHL transmission.

As part of a drive arrangement the SHL transmission 1 is placed between a prime mover 2 and an output drive train 3. The prime mover 2 may be an IC engine, such as a diesel engine, and/or and electric motor. The associated output drive train 3 may be for instance the drive train driving the running gear of a motor vehicle or the winch of a crane etc.

Figure 4:
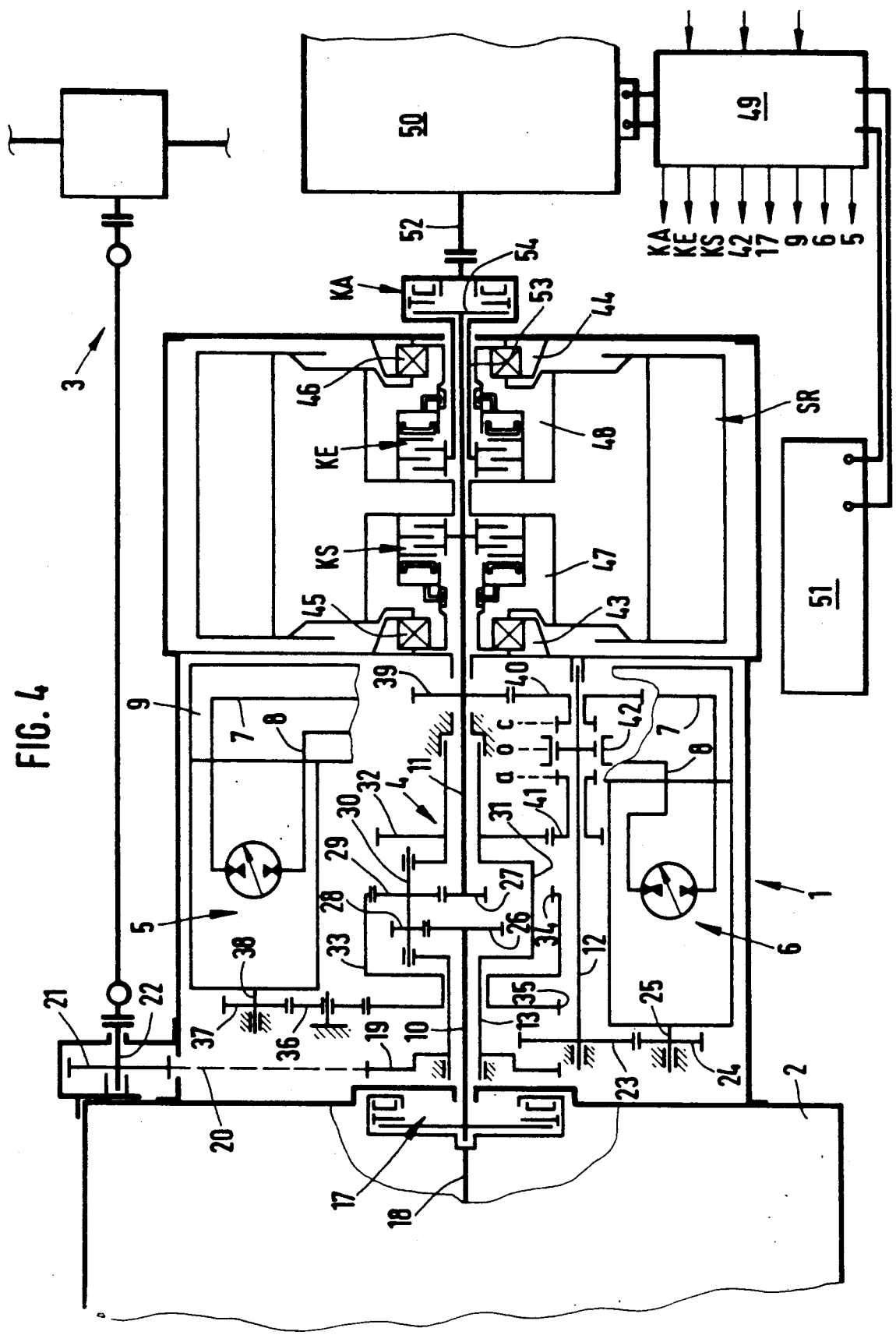
FIG. 4 shows the drive arrangement of FIG. 3 with the addition of some auxiliary items.

In the case of FIGS. 3 through 5 the drive arrangement including the SHL transmission 1 is part of a vehicle or boat, generally the former. Owing to the degree of compactness which may be achieved, the drive arrangement particularly lends itself to installation in the transverse or longitudinal direction in front wheel drive private cars, in trucks, omnibuses and other commercial vehicles, and furthermore in tanks. In such cases the SHL transmission 1 will be located between the prime mover 2 (a diesel or gasoline engine) and a drive train 3 for driving an axle, to which the drive wheels of the vehicle are secured. In this respect the prime mover 2 is connected to one end of the housing of the SHL transmission 1. The other end of the SHL transmission 1 is connected to the housing at an energy storing flywheel SR thereof.

The SHL transmission 1 has as its main part an epicyclic differential 4 with at least four shafts and two hydrostatic machines 5 and 6, which are each able to be run as a motor or as a pump in either direction of rotation and are connected via hydraulic pressure lines 7 and 8 via an electrohydraulic control.

Within its housing the SHL transmission 1 has a first main shaft 10 connected with the prime mover 2, a drive shaft 11, which is not on the drive side, an auxiliary shaft 12 and a second main shaft 13 functioning as a drive shaft on the output side.

Figure 1:
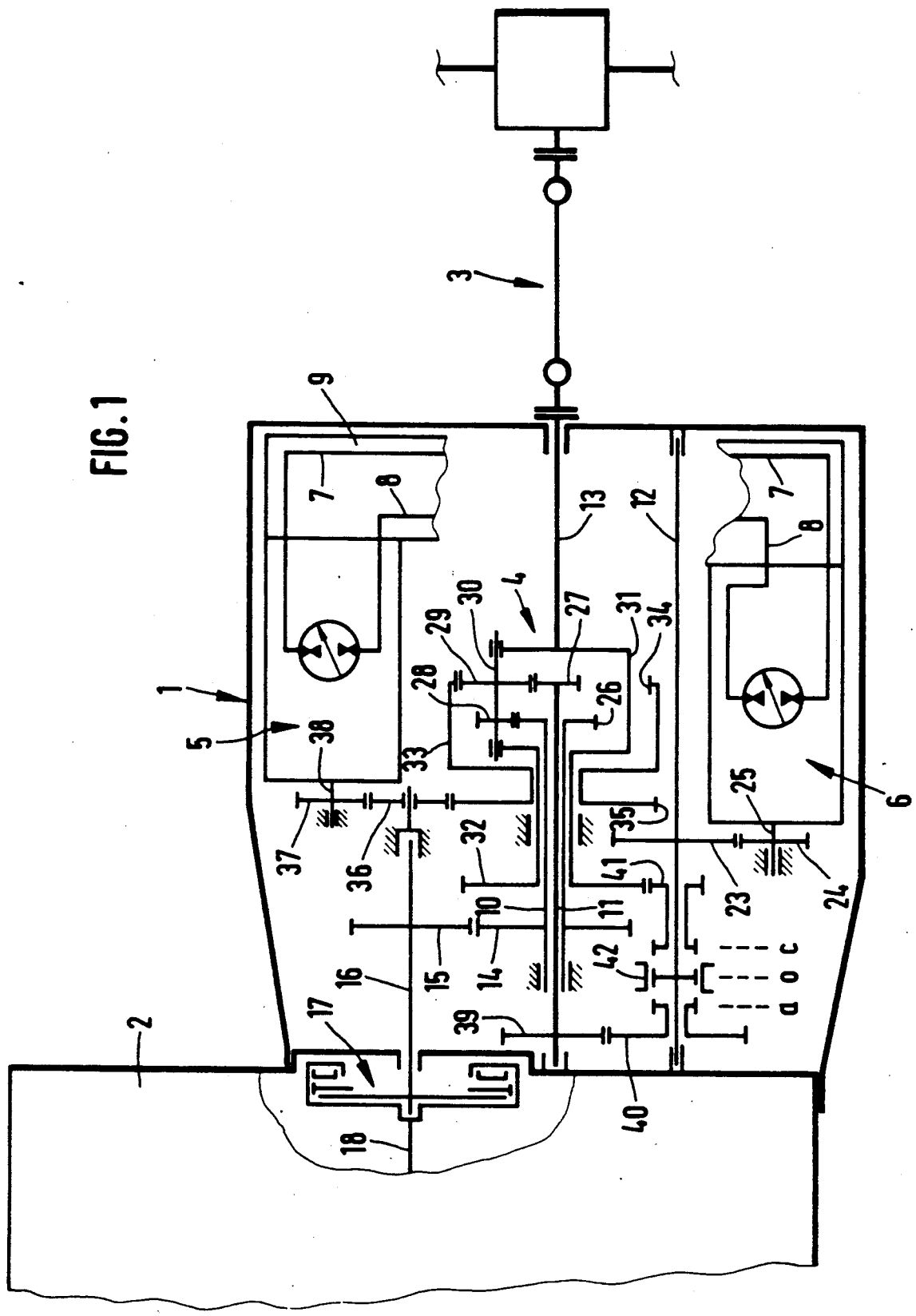

In the case of the design of FIG. 1 with a transmission output at the rear end of the vehicle, the main shaft 10 on the drive side is constituted by a hollow shaft which coaxially surrounds the drive shaft 11 (which is not on the drive side) and is connected by a transfer transmission with shaft 18 of the prime mover 2 (drive engine), such connection being by way of gearwheels 14 and 15, a shaft 16 and if required—as is here the case—a clutch 17.

Figure 2:
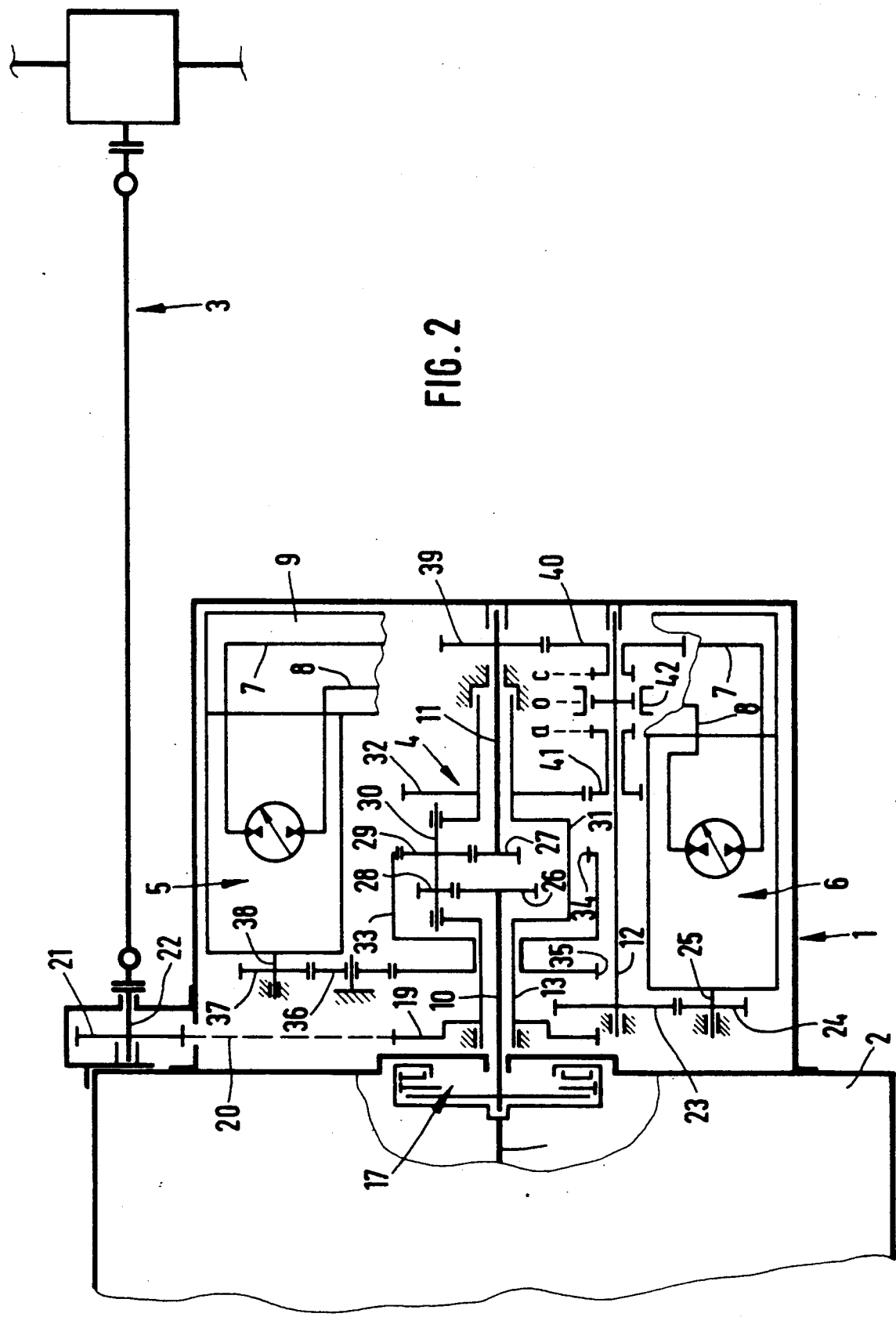

In the case of FIG. 2 with a lateral transmission drive output, the main shaft 10 on the input side is constituted by a solid shaft and connected either directly or, as indicated, via a clutch 17 with the shaft 18 of the prime mover 2 in the form of the drive engine.

The output drive train 3 is in the case of FIG. 1 directly connected with the main shaft 13 on the output side and extending out of the housing of the SHL transmission.

On the other hand in the case of FIGS. 2, 3 and 4 the output drive train 3 is connected indirectly, that is to say via gearing 19, 20 and 21 extending laterally out of the housing of the SHL transmission 1, with the connection shaft 22 on the outer output side drive shaft 13 of the SHL transmission 1.

A transfer transmission consisting for instance of gearwheels 23 and 24 serves to connect the shaft 25 of the hydrostatic machine 6 with the auxiliary shaft 12, or more generally, the shaft 25 may be connected directly with the auxiliary shaft 12.

The mechanical part of the SHL transmission 1 formed by the epicyclic differential 4 comprises a first large sun wheel 26, which is permanently connected with the main shaft 10 on the drive side, a small sun wheel 27 permanently connected with the drive shaft 11 not on the drive side, two axially spaced linked planet wheels 28 and 29 respectively meshing with the solar wheels 26 and 27, a web 31 carrying the two planet wheels 28 and 29 by means of a shaft 30 and itself permanently connected with the main shaft 13 on the output side, said web having a gearwheel 32 fixedly connected to it, and lastly an annulus 33. The latter has internal teeth 34 in mesh with the planet wheel 29, and external teeth 35 connected via gearwheels 36 and 37 with the shaft 38 of the hydrostatic machine 5.

In the epicyclic differential 4 the arrangement of the power transmitting parts is generally such that the effective point of input of the power of the main shaft 10 on the drive side (the sun wheel 26) is between the small sun wheel 27 arranged on the shaft 11 not on the drive side, and the drive engine 2 which in the drawing will be seen to be arranged on the left of the SHL transmission. Since the small sun wheel 27 only has to be slightly larger than the shaft 11 in diameter, the other parts 26, 28, 29, 31 and 33 of the epicyclic differential 4 may be designed to have a relatively small diameter so that the epicyclic differential 4 is generally very compact and of small overall size.

The mechanical part of the SHL transmission 1 further includes a gearwheel 39, which is fixedly mounted on the drive shaft 11 not on the drive side, and gearwheel 40 meshing with the wheel 39 and journaled on the auxiliary shaft 12 on which it is held in such a manner as to prevent relative axial sliding. A further gearwheel 41 on the auxiliary shaft 12 (on which it may be turned but is prevented from sliding) is in mesh with the gearwheel 32 mounted on the web 31.

A two-way clutch is provided whose shift member 42 is able to slide axially on the auxiliary shaft 12 without being able to turn in relation thereto. On shifting the shift member 42 out of the neutral position into one setting a the gearwheel 41 is coupled with the auxiliary shaft 12 in a rotation transmitting manner and in the other operational setting c the gearwheel 40 is drivingly connected with the auxiliary shaft 12. IN the neutral setting between the two operational positions a and c neither of the gearwheels 40 and, respectively, 41 is connected with the auxiliary shaft 12. The operating or shift member 42 of the two-way clutch is operated by pulses from a regulating and control device 49 (see FIGS. 3 and 4).

The speed of rotation of the main shaft 13 on the output side of the SHL transmission 1 represents the sum of the speeds of rotation of the large sun wheel 26 and the annulus 33, which set the peripheral speeds of the planet wheels 28 and 29 and, respectively, of the web 31. Owing to the gearing 35, 36 and 37 the speed and direction of rotation of the annulus 33 are the same as those of the hydrostatic machine 5.

Owing to the design of the SHL transmission 1 as described the same leads to generally the following effect during operation, attention being initially paid only to the design of FIGS. 1 and 2.:

In case in which the output drive train 3 is to be accelerated from rest or from a low speed, the hydrostatic machine 5 operates in a first operating range of the SHL transmission 1 ($n_{output}\ 13: n_{input}\ 10 \leq 50\%$) with a direction or rotation of the annulus 33 opposite that of the large sun wheel 26 as a pump and supplies the converted power via the pressure lines 7 and 8 to the hydrostatic machine 6. The latter then in this case operates as a motor and drives the auxiliary shaft 12, with which owing to the shift member 42 of the two-way clutch in the setting a the gearwheel 41 is coupled so that power is able to be transmitted via the web 31 and the main shaft 13 on the output side to the output drive train 3.

With an increase in the speed of rotation of the main shaft 13 on the output side the SHL transmission 1 will reach an operating point, at which the hydrostatic machine 5 will be at least substantially stationary the drive power supplied to the SHL transmission 1 by the prime mover 2 will be practically purely mechanically transmitted by the epicyclic differential 4. In this situation there will be, if the output drive train 3 is to be further accelerated, a transition to a second working range of the SHL transmission 1 (in which $n_{output}$ 13: $n_{input}$ 10 ≧ 50%) by switching over the operating member 42 of the two-way clutch into the operating setting c, whereupon the hydrostatic machine 6 will be drivingly connected via the auxiliary shaft 12, the gearwheel 40 coupled therewith and the gearwheel 39 meshing with it, with the second drive shaft 11. In this second working range of the SHL transmission 1 the hydrostatic machine 5 will operate with the same direction of rotation of the annulus 33 and of the large sun wheel 26 as previously, as a motor, which receives its drive power from the hydrostatic machine 6, now operating as a pump, via the pressure lines 7 and 8. The hydrostatic machine 6 accordingly receives its drive power from the main shaft 10 on the input side via the large sun wheel 26, the planet wheels 28 and 29, the small sun wheel 27 with the drive shaft 11, the gearing 39 and 40 connected with the auxiliary shaft 12 and the gearing 23 and 24.

If there is a reduction in the speed of rotation of the drive power train 3 the above events will take place in the reverse order.

Complex states arise in the embodiments of FIGS. 3 through 5 due to the auxiliary devices included therein. The following is a description of such complex states.

In conjunction with the SHL transmission 1 the energy storing flywheel SR forms a gyrostoring means as part of a brake energy recovery means and is mounted by means of two roller or ball bearings 45 and 46 in bearing mounts 43 and 44 of its housing. Each of the two roller or ball bearings 45 and 46 is in the illustrated working example mounted in a permanent manner on a trunnion of a bearing bushing 47 and 48 respectively, which is otherwise generally pot-shaped and installed in a suitable receiving cavity in the hub of the flywheel SR from the one or the other end. In both the designs of the invention in accordance with FIGS. 3 and 4 the bearing bushing 47 of the energy storing flywheel SR at the same time constitutes the housing of a clutch KS and accommodates its operating and coupling members and the input and output lines for hydraulic operation thereof. The shaft 11 carrying the sun wheel 27 (not on the drive side) is extended into the interior of the bearing bushing 47 in a manner coaxial to the axis of the flywheel and it is here connected with suitable coupling members of the clutch KS. When the clutch KS is engaged there is thus a driving connection between the SHL transmission 1 and the energy storing flywheel SR, while when the clutch KS is disengaged the driving connection is interrupted.

When the brakes of the vehicle are applied the regulating and control device 49, with which all or at least a large proportion of the switching members 2, 5, 6, 9, 17, 42, KS etc are connected, issues a signal to engage the clutch KS and to disengage the clutch 17. After this the energy storing flywheel SR is coupled with the SHL transmission 1, the drive engine 2 is on the other hand uncoupled from the latter. Accordingly the kinetic energy produced on braking at the axle driving train 3 may be stored in the energy storing flywheel SR (so that its speed of rotation is increased) via the SHL transmission 1. This stored energy may then be used for starting the vehicle from standstill and for accelerating and for a certain time for operation of the vehicle without using the drive engine 2, for example when traveling in pedestrian precincts areas with the supply of energy from the energy storing flywheel SR via the SHL transmission 1 to the axle drive train 3.

In a case in which the degree of energy storage in the energy storing flywheel SR is insufficient, it will be seen from the above described design of the SHL transmission 1 that starting from standstill and acceleration of the vehicle take place with the energy storing flywheel SR uncoupled (with the clutch KS disengaged) and with the drive engine 2 coupled (clutch 17 engaged) so that the manner of operation of the SHL transmission 1 will be exactly the same as described above with reference to FIGS. 1 and 2.

As regards the operation of the SHL transmission 1 and of the energy storing and energy releasing operation of the SHL transmission 1, this manner of functioning also applies for the working embodiment shown in FIG. 4 in a case in which a dynamo-electric machine 50, provided in addition, is switched into an inactive condition thereof.

The dynamo-electric machine 50 is connected by means of a further clutch KE to the energy storing flywheel SR and in response to signals from the regulating and control device 49 may then either (a) be operated as a generator, in which case by the release of energy from the energy storing flywheel SR electrical energy is produced and the same is stored in a battery 51 or (b) switched to operate as a motor and be able to be supplied from the battery 51 and then deliver energy via the energy storing flywheel SR (with clutches KS, KE and KA engaged and the clutch 17 disengaged) and the SHL transmission 1 to the axle driving train 3. In this case the vehicle is driven purely electrically, this being a great advantage in city driving due to the absence of emission of exhaust gases.

Like the clutch KS the further clutch KE is installed in an advantageous manner in the energy storing flywheel SR, which is adapted for this, on the other side thereof, the bearing bushing 48 forming the housing for the necessary switching and coupling members and also pressure supply and drain hoses for operation thereof.

In the normal case the shaft 52 of the dynamo-electric machine 50 is connected with a connecting shaft 53, which is extended coaxially into the energy storing flywheel Sr and is connected with the clutch members of the clutch KE.

In the example of the invention illustrated in FIG. 5 the dynamo-electric machine 50 is able to be switched to operate as a starter for the drive engine 2. For this purpose in the drive shaft train 52 and 53 between the dynamo-electric machine 50 and the second clutch KE there is the further clutch KA. This clutch has a clutch member 54 (in the drive shaft train 52 and 53) which is able to be coupled for starting of the drive engine 2 and is uncoupled during other operating phases of the system the member 54 being connected with the shaft 11 which is extended through the entire energy storing flywheel SR coaxially and carries the small sun wheel 27. During a starting operation using the dynamo-electric machine 50, the clutch 17 is engaged whereas the clutches KS and KE are disengaged whereby the energy storing flywheel SR does not have to be entrained.

FIG. 5 shows the installation of the systems of FIG. 4 in a motor vehicle, in the present case of truck in a front wheel drive, with diagrammatic outline. This figure serves to make clear the extreme compactness able to be obtained with this design.

What is claimed is:

1. A stepless hydrostatic mechanical transmission having an input side connected to a prime mover and an output side connected to a power output train comprising:
   a single epicyclic differential including first and second sun wheels, two planet wheels respectively meshing with said sun wheels, a web supporting said planet wheels and an annulus,
   a first main shaft driven at the input side by said prime mover and connected to said epicyclic differential to provide input drive thereto,
   a second main shaft at the output side connected to said epicyclic differential and to said power output train to deliver power to the power output train from the epicyclic differential,
   two hydrostatic machines coupled to said epicyclic differential for being respectively driven as a pump and a motor in successive working ranges of the power transmission,
   one of said sun wheels being connected for rotation with said first main shaft, said epicyclic differential driving the other of said sun wheels in rotation, said annulus being drivingly connected to one of said planet wheels and to one of said hydrostatic machines,
   clutch means for switching the other of said hydrostatic machines, when said one hydrostatic machine is stationary and during transition from one working range to another, from connection with said second main shaft at the output side to said other sun wheel and from the motor function to the pump function, said one sun wheel being located between said other sun wheel and said prime mover.

2. The power transmission as claimed in claim 1 wherein said first and second sun wheels have different diameters, said first sun wheel being of large diameter than said second sun wheel.

3. The power transmission as claimed in claim 2 wherein said first sun wheel is driven by said first main shaft.

4. The power transmission as claimed in claim 3 wherein said first sun wheel is rigidly secured to said first main shaft.

5. The power transmission as claimed in claim 3 wherein said second sun wheel is drivingly connected to said second main shaft.

6. The power transmission as claimed in claim 5 wherein said second sun wheel is rigidly secured to a solid shaft.

7. The power transmission as claimed in claim 6 comprising a further shaft rotatably supported by said web and securing said planet wheels for rotation therewith.

8. The power transmission as claimed in claim 1 wherein the prime mover is an engine of a vehicle, an energy storing flywheel being provided for storing energy from the engine, and further clutch means for selectively coupling and uncoupling said flywheel for drive with said other of the sun wheels.

9. The power transmission as claimed in claim 8 wherein said first and second sun wheels have different diameters, said first sun wheel being of large diameter than said second sun wheel and fixed to said first main shaft, said engine being drivingly connected to said first main shaft.

10. The power transmission as claimed in claim 8 comprising a housing for said transmission and a further housing for said flywheel, said housing for the flywheel being connected to the transmission housing in opposition to said engine.

11. The power transmission as claimed in claim 8 wherein said flywheel has a hollow interior cavity, said further clutch means being supported within said cavity.

12. The power transmission as claimed in claim 8 comprising a dynamo and another clutch means selectively coupling said dynamo to said flywheel for delivery of energy from said flywheel to the dynamo which then operates as a generator for delivering energy to a battery or for delivering energy from said dynamo, which then operates as a motor driven from the battery, through the flywheel and the transmission to said power output train.

13. The power transmission as claimed in claim 12 wherein said flywheel has a hollow interior cavity, said another clutch means being supported with said cavity.

14. The power transmission as claimed in claim 12 comprising an additional clutch means between said dynamo and said second sun wheel and between said dynamo and said another clutch means for selectively delivering drive from the dynamo, as a motor, to the second sun wheel for starting the engine.

* * * * *